Sept. 22, 1931.  J. CRYNS  1,824,124
OVEN LOADER
Filed April 3, 1931  3 Sheets-Sheet 1
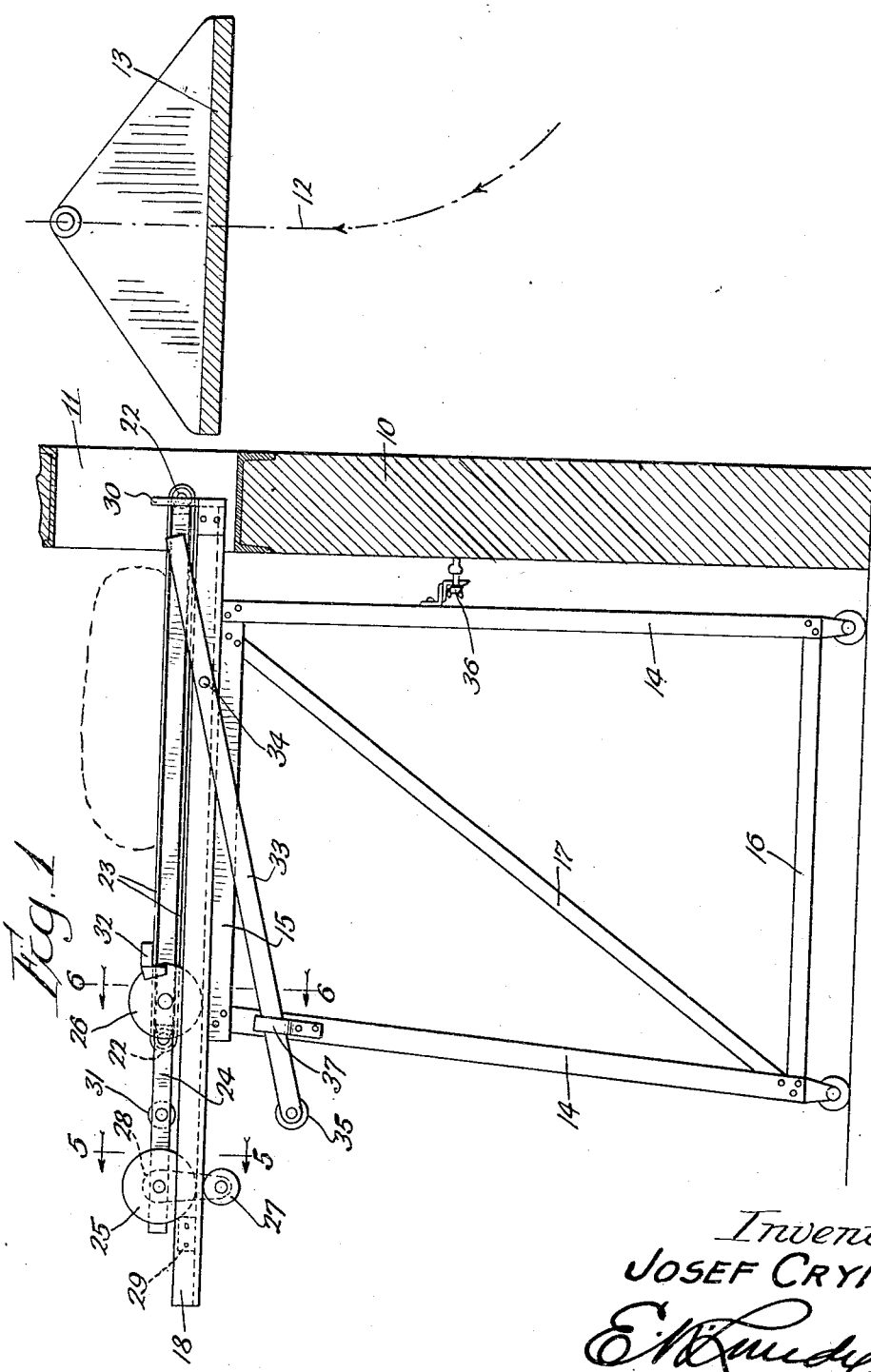
Inventor:
JOSEF CRYNS Sept. 22, 1931.  J. CRYNS  1,824,124
OVEN LOADER
Filed April 3, 1931  3 Sheets-Sheet 2
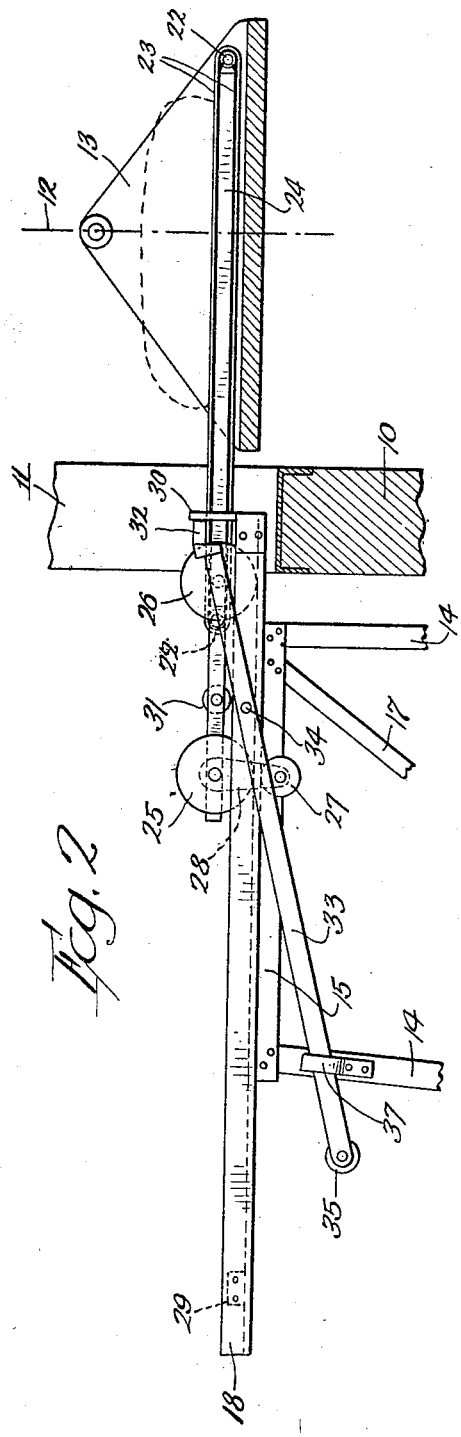
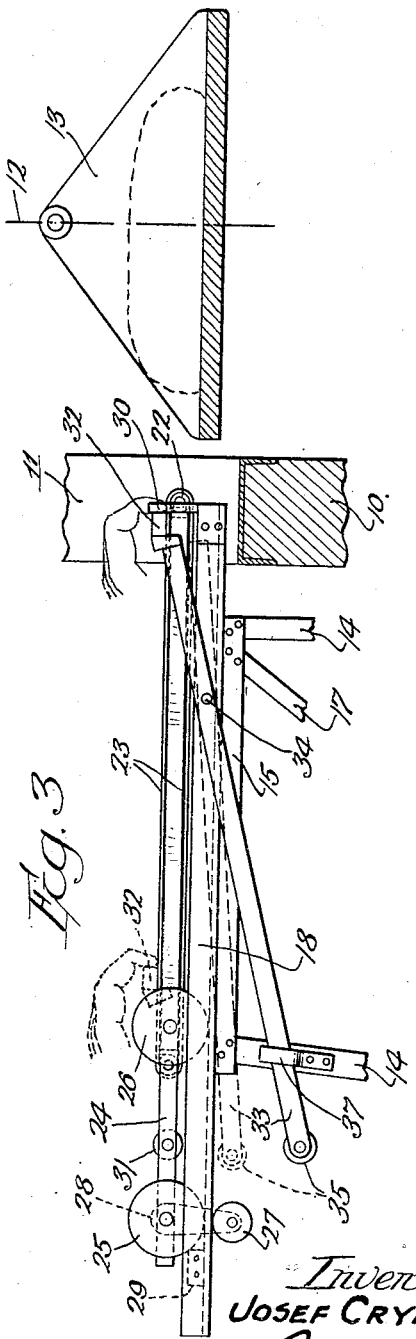
Inventor:
JOSEF CRYNS

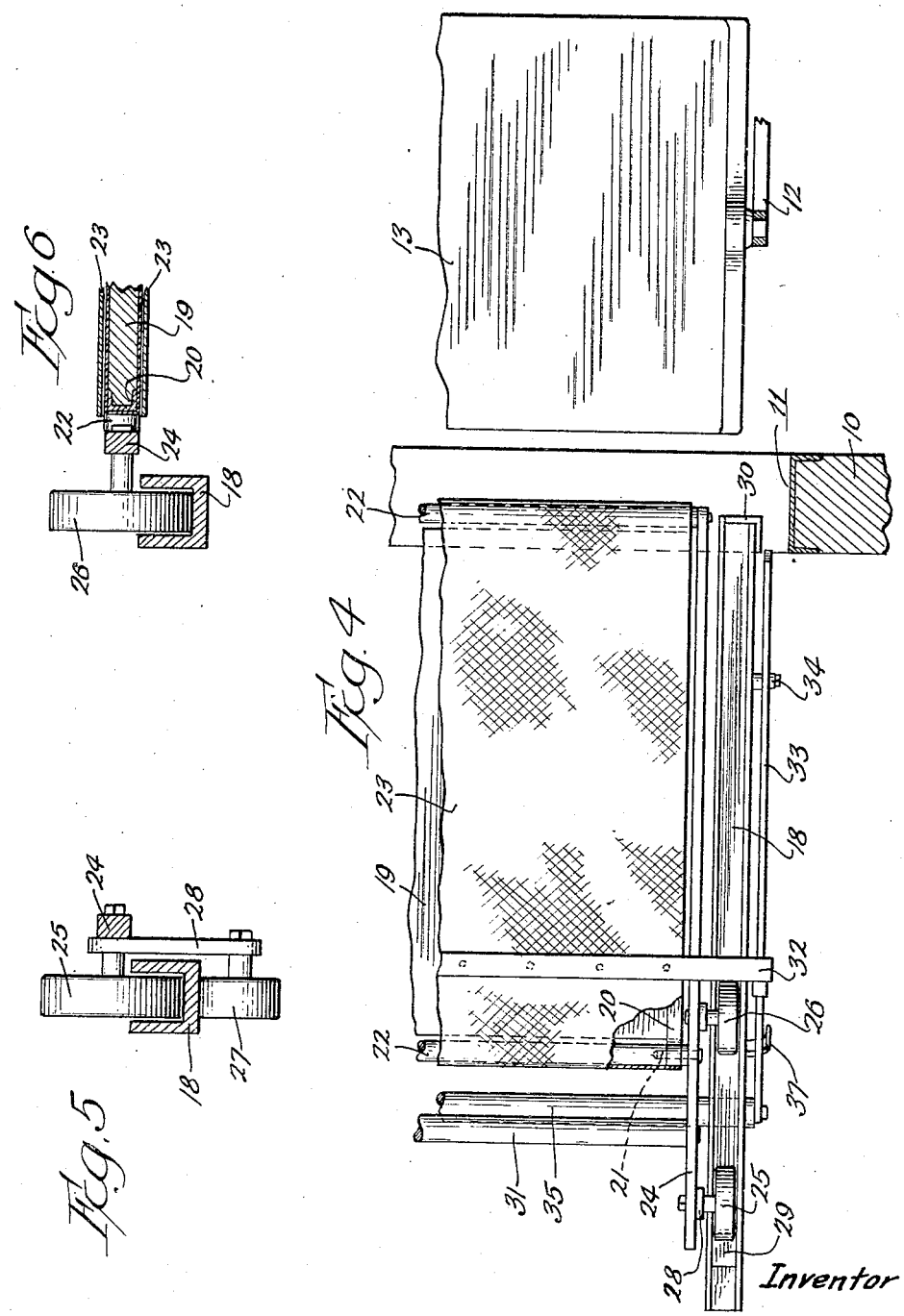

Patented Sept. 22, 1931

1,824,124

UNITED STATES PATENT OFFICE

JOSEF CRYNS, OF CHICAGO, ILLINOIS, ASSIGNOR TO THE PETERSEN OVEN COMPANY, OF CHICAGO, ILLINOIS, A CORPORATION OF ILLINOIS

OVEN LOADER

Application filed April 3, 1931. Serial No. 527,411.

My present invention relates to traveling tray bake ovens, and it has more particular reference to a loading apparatus for ovens of this character whereby the loaves of unbaked dough may be inserted through the oven door and deposited upon the adjacent upwardly moving tray.

Primarily, an object of my invention is to provide an apparatus of this character that is of simple construction and is capable of dependable operation. Obviously with the use of an automatic loading device, it is possible to dispense with the use of special appurtenances that have previously been employed for discharging the goods upon the trays. The present structure is so made that it may be readily inserted through the oven door and the loaves of dough quickly deposited upon a moving tray without disturbing the condition of the dough, and provision is made so that, in the event the tray has moved too far upwardly and should engage the inner end of the carriage of the loader, such contingency will not disrupt the loading mechanism due to the particular construction and manner of mounting the carriage which permits the latter being lifted from the tracks at its end nearest to or within the oven.

The loading device herein disclosed is novel in construction and easy to operate, and will discharge the loaves of dough dependably and quickly upon the trays. The device is sturdy in construction to withstand hard usage and therefore it will not readily get out of order. Other objects and advantages of the invention will be obvious to others after the structure is understood from the accompanying descriptions.

I prefer to accomplish the numerous objects of my invention, and to construct the apparatus, in its typical form, in substantially the manner hereinafter fully described and as more particularly pointed out in the claims. Reference is herein made to the accompanying drawings that form a part of this specification, in which, Figure 1 is a vertical side elevation of my loading device mounted in front of an oven doorway and in a position prior to being inserted into the oven.

Figure 2 is a view of the upper portion of Figure 1 showing the carriage portion of the loader inserted through the doorway and above the adjacent tray.

Figure 3 is a view similar to Figure 2 showing the relative positions of the parts immediately upon the withdrawal of the carriage, after a row of dough loaves have been deposited on the tray.

Figure 4 is a top plan of an end portion of the loading apparatus, the parts being in the position shown in Figure 1.

Figure 5 is a vertical transverse section taken on line 5—5 of Figure 1 and enlarged.

Figure 6 is a vertical transverse section taken on line 6—6 of Figure 1 and enlarged.

The drawings are to be understood as being more or less schematic for the purpose of disclosing a typical or preferred type of my invention, and in these drawings similar reference characters have been employed to designate like parts wherever they appear in the several views. It will also be understood that said drawings and the within description are given for the purpose of clearness of understanding only, and no unnecessary limitations are to be understood therefrom.

In the drawings the front wall of the oven is designated by the numeral 10 and it has a horizontally elongated doorway or door-opening 11 extending substantially the width of the oven structure, while immediately within the oven is a chamber in which an endless conveyer in the form of a link belt 12 moves in an upward direction carrying the horizontal elongated trays 13 pendently thereon. The conveyers or link belts are at opposite sides of the oven chamber and move in unison so as to lift and carry the trays at the ends of the latter.

The loading structure which I have devised comprises a reciprocable carriage that moves into and out of the oven door and is mounted upon a support in the form of a skeleton frame. This support or frame consists of a plurality of substantially vertical posts 14 connected at their top and bottoms by horizontal bars 15 and 16 respectively and it is braced by diagonal struts 17. This forms an open supporting frame or table about the height of the door sill and extending the horizontal length of the doorway. Angle metal parallel tracks or rails 18 are secured to the ends of the frame and overhang the latter as seen in Figures 1, 2 and 3, thus affording supports and guides for the reciprocable carriage.

The carriage consists of a rectangular-shaped flat bed 19 formed preferably of a plate of wood, ply-board or other suitable material and having its transverse end edges reinforced by channel pieces 20 (Fig. 6). These channel pieces have their ends projected beyond the bed plate 19 and have the trunnions 21 of rollers 22 journaled therein to permit free rotation of said rollers. Rollers 22 are disposed close to the longitudinal edges of the bed plate 19 and an endless flexible apron 23 circumscribes said plate and rollers to provide a conveyer upon which the loaves of unbaked dough are placed for loading into the oven.

A pair of parallel end bars 24 extend alongside the ends of the bed plate and the trunnions 21 of the rollers, after passing through the extended portions of the reinforcing channel pieces, are rotatably secured in adjacent portions of the bars 24. The supporting wheels 25 and 26 of the carriage are rotatably mounted on spindles that project outwardly on the end portions of the bars 24 farthest from the oven and the lower peripheries of the wheels rest upon the horizontal flanges of the tracks or rails 18 to guide the carriage in its reciprocating movements into and out of the oven. In order to prevent the bed of the carriage from tilting downwardly, and at the same time permit it to be lifted at its end nearest the oven I provide retaining wheels 27 that engage the under portions of the tracks or rails 18 and said wheels are rotatably mounted upon spindles projecting laterally outwardly from the lower ends of pendent links 28 hung from the spindles of the wheels 25. Blocks 29 are secured in the tracks 18 adjacent the outer ends of the latter to prevent the carriage being rolled off the same and upright stop plates 30 are secured to the opposite ends of the tracks or rails to arrest inward movement of the carriage into the oven.

The handle 31 extends between the outer ends of the bars 24 and has its ends secured to the latter so that the operator may grasp this handle and reciprocate the carriage upon the tracks. When the loaves of unbaked dough are arranged in a row upon the bed and apron the carriage is moved into the oven in a plane above the tray and immediately withdrawn.

During the withdrawal movement the apron is gripped or held and the bed moves independently of the apron while the rollers 22 assist in this operation. In order to hold the apron in the manner suggested I secure a cross-piece 32 to the upper reach of the apron, which cross-piece extends beyond the carriage and beyond the vertical planes of the tracks or rails 18, in the manner shown in Figure 4. The projecting or extended portions of the cross-piece 32 are adapted to be engaged by the ends of arms or lever rods 33 that have their fulcrums or pivots 34 on the outer portions of the rails or upon the adjacent portions of the supporting frame. As will be seen in the drawings the fulcrums of these levers or arms are towards the ends thereof nearest the oven so that the longer portions of these levers or arms act as counterweights to normally hold the members in the positions shown in Figures 1, 2 and 3. The shorter ends of the arms or levers extend above the rails and into the paths of the projecting portions of the cross-piece 32 that is secured to the apron and the opposite ends of said arms or levers are connected by a handle or grip 35.

When the carriage is pushed away from the operator and moved into the oven the extended portions of the cross-piece 32 will pass over and depress the adjacent short end portions of the levers or arms 33 and permit them to raise again back of said cross-piece in the position shown in Figure 2. This holds the cross-piece 32 between the adjacent short ends of the levers or arms 33 and the stop plates 30 and when the operator withdraws the carriage the apron will remain gripped and the bed will travel out, thus depositing the loaves of dough in a row upon the tray within the oven. After the carriage has been moved out of the oven to its full limit as shown in Figure 3, the operator lifts the lever handle 35 to its dotted position (Fig. 3) thus releasing the cross-piece 32 which may then be grasped by the operator and drawn towards him until said cross-piece engages the adjacent wheel 26 of the carriage. This returns the apron and carriage structure to their positions for depositing a new row of loaves of dough thereon preliminary to the next loading operation or movement of the carriage into the oven. The operation above described is repeated for each tray as it approaches the oven doorway. If desired, the supporting frame may be connected to the oven wall by means of a latch device indicated schematically at 36 in Figure 1. In order to support the long end portions of the levers or arms 33 I place a bracket 37 upon the upper portions of the uprights or posts 14 that are farthest from the oven.

What is claimed is:—

1. A loading device for ovens comprising a support, a carriage reciprocable thereon and having a flat supporting bed, an endless apron circumscribing said bed and capable of movement independently thereof, a cross-piece secured to said apron and extended beyond the side edges thereof, and arms pivoted intermediate their ends on said support, said arms having their ends nearest the oven positioned normally in the path of movement of the extended portions of said cross-piece to arrest progress of the apron during movement of the carriage away from the oven and having their other ends extended towards the end of the support farthest from the oven in ready reach of the operator.

2. A loading device for ovens comprising a support, a carriage reciprocable thereon and having a flat supporting bed, rollers at the forward and rear edges of said bed, an endless apron circumscribing said bed and rollers and being capable of movement independent of said bed, a cross-piece secured to the top reach of said apron, and arms pivoted intermediate their ends on said support, said arms having their ends adjacent the oven normally in the path of and adapted to engage said cross-piece and hold the apron during movement of the carriage away from the oven, and having their other ends extended to the end of the support farthest from the oven in ready reach of the operator.

3. A loading device for ovens comprising a support, a carriage reciprocable thereon having a flat supporting bed, rollers at the forward and rear edges of said bed, an endless apron circumscribing said bed and rollers and capable of movement on said bed, a cross-piece secured to one of the reaches of said apron and projecting beyond the side edges of the latter, gravity returnable arms fulcrumed on said support and having their ends normally disposed in the path of movement of the projecting portions of said cross-piece whereby to engage the same and hold the apron during retractive movement of the carriage, and a bar connecting the ends of said arms remote to said cross-piece to move the arms in unison.

Signed at Chicago, in the county of Cook, and State of Illinois, this 20th day of March, 1931.

JOSEF CRYNS.